(12) United States Patent
Montgomery

(10) Patent No.: US 9,347,761 B2
(45) Date of Patent: May 24, 2016

(54) TWO-WAY ROUNDNESS DEVICE

(71) Applicant: Cedarflat Precision Inc., Burnaby (CA)

(72) Inventor: Darcy Thomas Montgomery, Burnaby (CA)

(73) Assignee: Cedarflat Precision Inc., Burnaby (CA)

( * ) Notice: Subject to any disclaimer, the term of this patent is extended or adjusted under 35 U.S.C. 154(b) by 240 days.

(21) Appl. No.: 14/297,049

(22) Filed: Jun. 5, 2014

(65) Prior Publication Data

US 2014/0360035 A1    Dec. 11, 2014

Related U.S. Application Data

(60) Provisional application No. 61/831,742, filed on Jun. 6, 2013.

(51) Int. Cl.
*G01B 5/20* (2006.01)

(52) U.S. Cl.
CPC .................................. *G01B 5/201* (2013.01)

(58) Field of Classification Search
CPC ........ G01B 5/201; G01B 5/008; G01B 11/08; G01B 5/012; G01B 7/001; G01B 7/282; G01B 7/34
USPC .......................................................... 33/503
See application file for complete search history.

(56) References Cited

U.S. PATENT DOCUMENTS

| | | | | |
|---|---|---|---|---|
| 4,414,748 A * | 11/1983 | Gauler | ............... | G01B 5/201 269/21 |
| 5,419,222 A | 5/1995 | Bieg | | |
| 6,327,788 B1 * | 12/2001 | Seddon | ............... | G01B 5/201 33/543 |
| 6,526,364 B2 * | 2/2003 | Omori | ............... | G01B 21/20 702/151 |
| 6,655,672 B2 | 12/2003 | Tsuruta | | |
| 6,668,466 B1 * | 12/2003 | Bieg | ............... | G01B 5/008 33/1 PT |
| 7,290,348 B2 * | 11/2007 | Katamachi | ............... | G01B 5/0016 33/550 |
| 8,051,576 B2 | 11/2011 | McDonnell et al. | | |
| 2010/0293800 A1 * | 11/2010 | Nakayama | ............... | G01B 21/047 33/558 |
| 2011/0005095 A1 * | 1/2011 | Nakayama | ............... | G01B 3/008 33/556 |
| 2013/0006579 A1 | 1/2013 | Sakurada et al. | | |
| 2014/0360035 A1 * | 12/2014 | Montgomery | ............... | G01B 5/201 33/550 |
| 2016/0040987 A1 * | 2/2016 | Bernhardt | ............... | G01B 21/04 33/503 |
| 2016/0084631 A1 * | 3/2016 | Nakayama | ............... | G01B 5/201 33/550 |

FOREIGN PATENT DOCUMENTS

| | | |
|---|---|---|
| CN | 102944190 A | 2/2013 |
| DE | 10340851 A1 | 3/2004 |

OTHER PUBLICATIONS

Taylor Hobson; "Talyrond 450"; 2012; pp. 1-4.
Taylor Hobson; "Talyrond 385 XL"; 2008; pp. 1-3.
Chetwynd, D.G., et al.; "Improving the Accuracy of Roundness Measurement"; IOP Science; Journal of Physics E: Scientific Instruments; 1976; vol. 9; pp. 537-544; Great Britain.

(Continued)

*Primary Examiner* — Yaritza Guadalupe-McCall
(74) *Attorney, Agent, or Firm* — Miltons IP/p.i.

(57) ABSTRACT

A two way roundness device can be configured as a device in which a tool, such as an indicator rotates or as a device in which the part to be measured or cut rotates. This ability to alternate between these two configurations is enabled by a combination of a rotating spindle assembly and a two-axis stage that can be oriented, in use, with the two-axis stage under the spindle assembly or with the two-axis stage on top of the spindle assembly.

20 Claims, 9 Drawing Sheets

(56) References Cited

OTHER PUBLICATIONS

Thalmann, Ruedi; "Basics of Highest Accuracy Roundness Measurement"; Simposio de Metrologia; Oct. 25-27, 2006; pp. 1-6.

Nugent, Pat; "Form Measurement Fundamentals"; Mahr; Apr. 2008; pp. 1-59.

Haitjema, H., et al.; "International comparison of roundness profiles with nanometric accuracy"; Metrologia, 1996; vol. 33; pp. 67-73.

Taylor Hobsen Precision; "A guide to the Measurement of Roundness"; RParam 5E SP 08/05, pp. 1-9.

Jenoptik; "Hommel-Etamic roundscan Fast, accurate form and roughness measurement"; pp. 1-15.

Taylor Hobsen; "Talyrond 1600"; roundness concentricity and flatness measuring machine for large parts.

Taylor Hobsen; "Surtronic R-series—High speed roundness systems for bearings; automotive and precision industries"; Surtronic Roundness; Jul. 2011; pp. 1-11.

Starrett; "RT800 Roundness Measurement Systems"; Bulletin 2100; Apr. 2012; pp. 1-8.

Mitutoyo America Corporation; "Mitutoyo Roundness Measurement Instruments—for a complete range of applications from the lab, to the shop or production floor."; Mitutoyo Bulletin No. 1750; Aurora, IL, USA; Jul. 2004; pp. 1-20.

The American Society of Mechanical Engineers; "Dimensioning and Tolerancing"; ASME Y14.5-2009; Mar. 27, 2009; pp. 94-96.

Moore, Wayne R.; "Foundations of Mechanical Accuracy"; The Moore Tool Company, Inc., Bridgeport, Connecticut, USA; First edition, fourth printing, 2005; pp. 254-262.

Marsh, Eric R.; "Precision Spindle Metrology"; Second Edition; DEStech Publications, Inc.; Lancaster, PA, USA; 2010; pp. 76-77, 136-142.

The American Society of Mechanical Engineers; "Axes of Rotation; Methods for Specifying and Testing"; ASME B89.3.4-2010; May 12, 2010; pp. 41-44.

Curtis, Mark A., et al.; "Handbook of Dimensional Measurement"; Fourth Edition; Industrial Press, Inc.; New York, NY, USA; 2007; pp. 377-409.

The American Society of Mechanical Engineers; "Measurement of Out-of-Roundness"; American National Standard; ANSI B89.3.1-1972; New York, NY, USA; pp. 1-27.

\* cited by examiner

TWO-WAY ROUNDNESS DEVICE

CROSS-REFERENCE TO RELATED APPLICATIONS

This application claims the benefit of U.S. Provisional Patent Application No. 61/831,742 filed Jun. 6, 2013.

TECHNICAL FIELD

The present application relates to an apparatus for testing roundness or other geometric properties of a round surface or holding a tool for creating or modifying a round surface.

BACKGROUND

Roundness (circularity) of a surface is the requirement that every point on the surface be located between two perfect concentric circles, with the radial difference between the circles being the magnitude.

There are many methods for measuring roundness. Some methods are:
  Placing the round part in a V-block and rotating it by hand with an indicator at TDC (top-dead-centre)
  Measuring the diameter at several locations with a micrometer or caliper
  Using a coordinate measuring machine
  Taking a photo and analyzing the data with image processing software
  Measuring the radius at several locations with a radius meter
  Using a precision spindle assembly (such as an air bearing spindle assembly) to rotate a part with respect to an indicator, or to rotate the indicator with respect to the part Each of these methods has advantages and disadvantages. For example, using a precision spindle assembly to measure roundness is a simple concept but there are a few difficulties with implementing the concept. First, the centre of the part must be made coincident with the centre of the axis of rotation of a spindle assembly. This can be done mechanically by moving one or the other until they are coincident, or by recording the measured data and post-processing to remove the fundamental (1 cycle per rotation) component. This post-processing is valid because the fundamental component is effectively the eccentricity and not related to the roundness of the part. Even with post-processing, it is usually still required to centre the part to some degree.

Second, the motion of the spindle assembly itself has errors that might be significant. In general, these errors can be measured and either accepted as measurement errors, or if repeatable then accounted for.

Third, the angle of the part to be measured is relevant. It is sometimes necessary to adjust the orientation of the spindle assembly and the orientation of the axis of the measured surface to be parallel within some value. Depending on the parallelism requirement, a mechanism may be required for making this adjustment. If there is significant tilt between the axes, the result is an elliptical measured shape, which is impossible to distinguish from an actual roundness error without further testing.

Fourth, there are many other sources of measurement error including: deflection of parts due to external loading, deflection of a spindle bearing due to external loading, thermal expansion of parts in the metrology loop, indicator errors, deformation of the part due to clamping or gravity forces, and deflection of the part due to indicator contact forces.

There are two general types of precision spindle roundness testers, those where the indicator rotates and the part is fixed, and those where the part rotates and the indicator is fixed. The vast majority are of the second type.

Several other geometric characteristics are often measured with precision spindle roundness testers including: concentricity, flatness, cylindricity, runout, and surface roughness. All of these including roundness can be critical to the performance and safety of various machine elements.

DETAILED DESCRIPTION

Figure 1A:
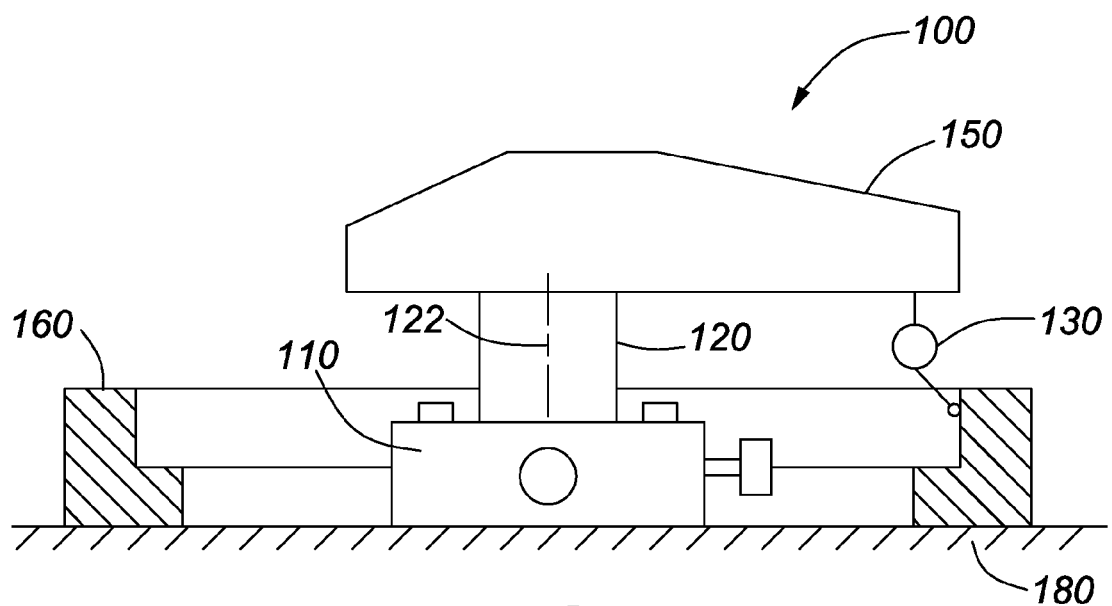
FIG. 1A is a side view schematic diagram of a two-way roundness device in accordance with one example embodiment of the present disclosure.

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

It is to be understood that when terms defining angles, dimensions or physical characteristics are used, such as right angle or perpendicular, they are intended to include embodiments that are slightly off the described angle, characteristic or dimension.

The present disclosure describes a two-way roundness device that can be configured either as a tester in which the indicator rotates or as a tester in which the part to be measured rotates. This ability to alternate between these two configurations is enabled by a combination of a rotating spindle assembly and an two-axis stage that can be oriented, in use, with the two-axis-stage (such as but not limited to an XY-stage or an XZ-stage) under the spindle assembly or with the two-axis-stage on top of the spindle. The two-axis stage is movable in two perpendicular directions. The indicator can be replaced with any tool suitable for working on parts with round surfaces, such as a cutting tool.

With the two-axis stage on the bottom, the spindle assembly rotates within the two-axis stage and an attachment with the indicator can be attached to the spindle assembly so that it can rotate around a part when the spindle assembly is placed in the center of the part.

With the two-axis stage on top, the two-axis stage rotates while the spindle assembly is held stationary in a base. A part can then be placed on the two-axis stage to be measured by an indicator attached to the base or fixed earth by an arm.

In one aspect, there is provided a two way roundness device operable in two different configurations comprising: a two-axis stage, movable in two perpendicular directions and having a first side with a planar portion sufficient to support the two-way roundness device when the first side is resting on a flat surface, the planar portion being parallel to the two directions of movement; a spindle assembly attached to the two-axis stage in the center of a second side opposite the first side, the spindle assembly being rotatable about longitudinal axis of rotation perpendicular to the two directions of movement of the two axis stage; and an arm having a tool receiving portion and being attachable to the spindle assembly, whereby, in a first configuration, the two way roundness device is operable with the spindle oriented above the first side, with the arm attached to the spindle and the spindle assembly being rotatable; and in a second configuration, the two way roundness device is operable with the first side oriented above the spindle assembly and the two-axis stage being rotatable.

In an embodiment, the roundness device further comprises a base attachable to fixed earth on one side and attachable to the spindle assembly.

In an embodiment, the spindle assembly comprises an attachment for receiving the arm such that one end of the arm is held at a distance from the axis of rotation.

In an embodiment, the arm extends at an angle from the axis of rotation. In an embodiment, the angle is 90 degrees.

In an embodiment, the spindle assembly comprises a bore extending through the spindle assembly at an angle to the axis of rotation.

In an embodiment, the roundness device further comprises an arm configured to be attached to fixed earth or the base and extend at a distance from the axis of rotation of the spindle assembly. In an embodiment, the arm comprises a tool receiving attachment at a distance from the axis of rotation. In an embodiment, a position of the tool receiving device is adjustable. In an embodiment, the roundness device further comprises an indicator for measuring roundness and wherein the tool receiving attachment is configured to receive the indicator. In an embodiment, the roundness device further comprises a tool for creating a round surface and wherein the tool receiving attachment is configured to receive the tool.

In an embodiment, the first side is attachable to a base.

In an embodiment, the first side is attachable to fixed earth.

In an embodiment, the roundness device further comprises a platform attachable to the first side.

In an embodiment, the base is rectangular in a plane perpendicular to the axis of rotation.

In an embodiment, the roundness device comprises components made of non-magnetic material.

In an embodiment, the spindle assembly comprises a bearing assembly comprising rolling element bearings for causing rotation of the spindle assemble.

In an embodiment, the spindle assembly comprises a bearing assembly comprising an air bearing for causing rotation of the spindle assembly. In an embodiment, the roundness device further comprises a rotary joint for supplying pressurized air to the air bearing.

In an embodiment, the spindle assembly comprises a bearing housing one or more bearings.

In an embodiment, the roundness device further comprises an encoder for measuring angular movement.

In an embodiment, the roundness device comprises a motor for turning the spindle assembly or the two-axis stage.

In some embodiments, the spindle assembly and the two-axis stage can be rotated manually. In other embodiments, the device comprises a motor for rotating the spindle assembly or the two-axis stage.

In some embodiments, the roundness device further comprises a rolling element bearing; a mechanical device to limit rotation of the spindle assembly to a predetermined angle; an indicator for measuring roundness. In some embodiments, the mechanical device is a toggle.

In some embodiments, the roundness device further comprises a rolling element bearing; mechanical counter to measure the absolute angle of rotation of the spindle assembly; and an indicator for measuring roundness.

In some embodiments, the two-axis stage is an XY stage.

In some embodiments, the two-axis stage is an XZ stage.

In some embodiments, the spindle assembly comprises a bearing housing, the bearing housing also being an integral part of the two-axis stage.

Embodiments of the device described herein enable both types of precision spindle assembly roundness tester with single device. That is, each single device can be used in a configuration where the part to be tested rotates and in a configuration where the indicator or tool rotates. The device can also be used as a portable device or in a fixed location. The device is suitable for measuring a very wide range of part sizes.

Figure 1B:
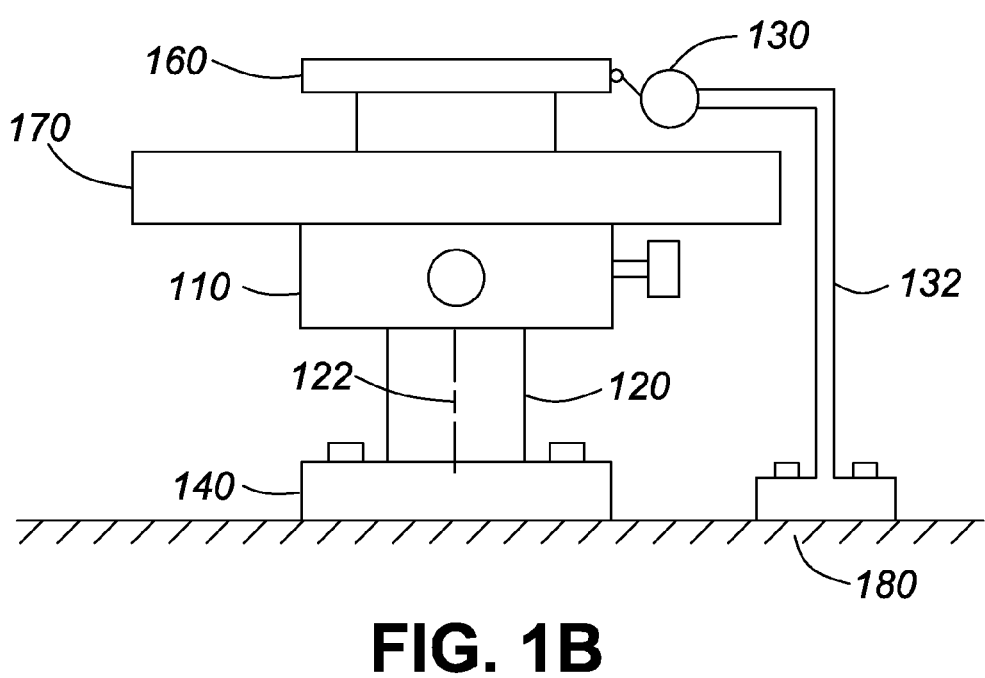
FIG. 1B is a side view schematic diagram of a two-way roundness device in accordance with one example embodiment of the present disclosure.
Figure 2:
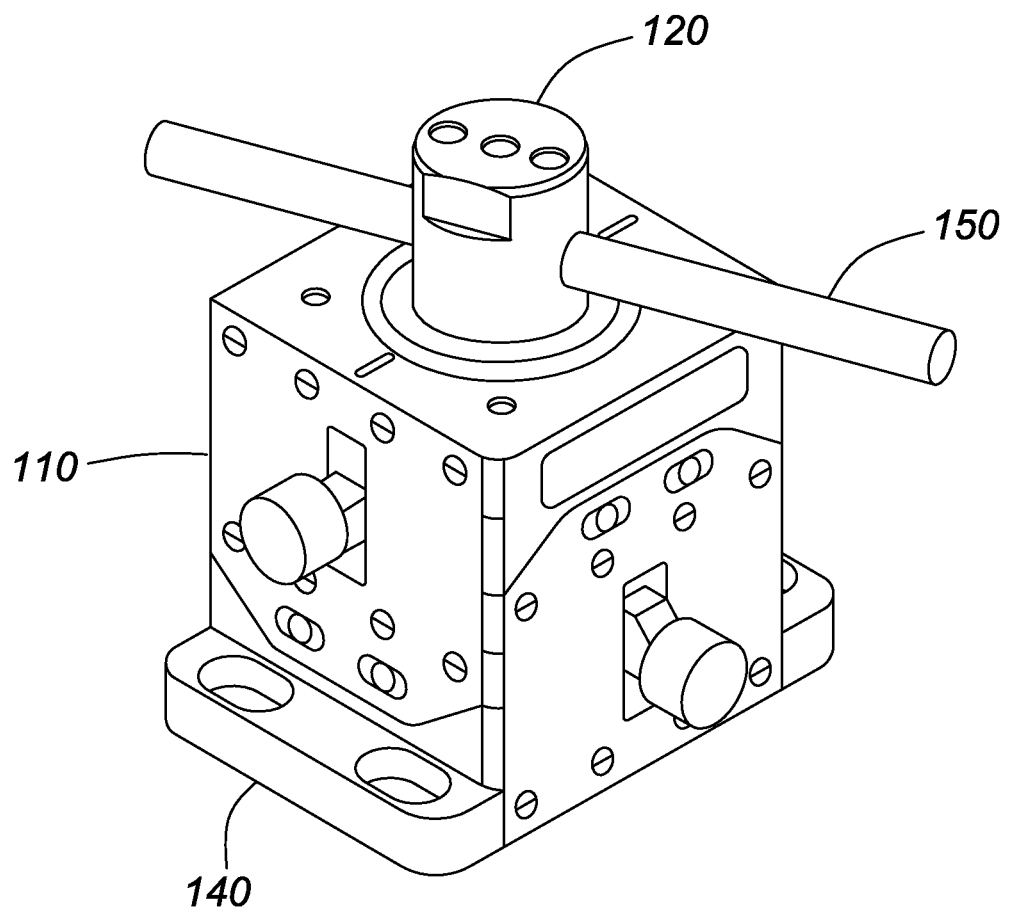
FIG. 2 is an isometric view schematic diagram of a two-way roundness device in accordance with one example embodiment of the present disclosure.
Figure 3:
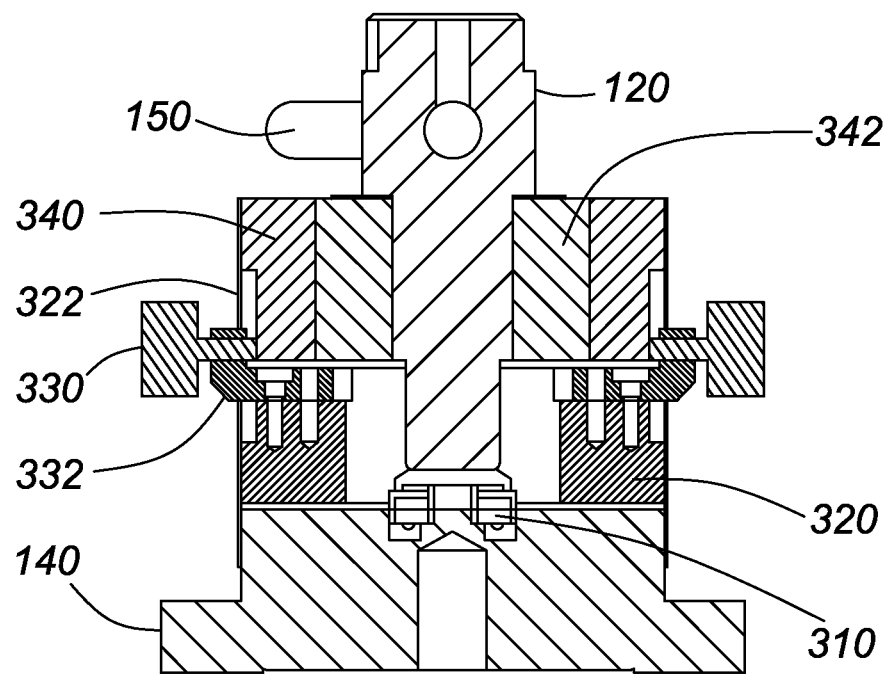
FIG. 3 is a side view schematic diagram of a two-way roundness device in accordance with one example embodiment of the present disclosure.
Figure 4:
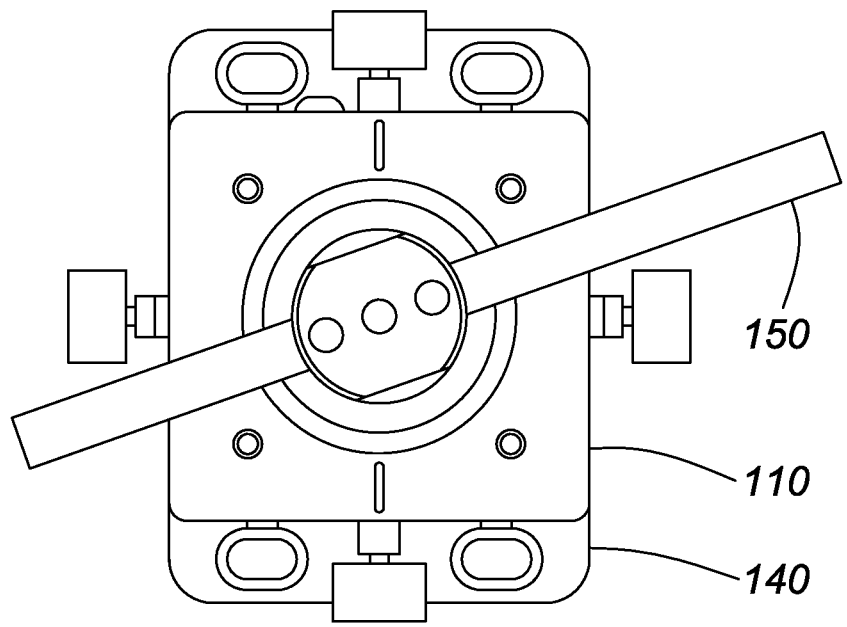
FIG. 4 is a top view schematic diagram of a two-way roundness device in accordance with one example embodiment of the present disclosure.
Figure 5:
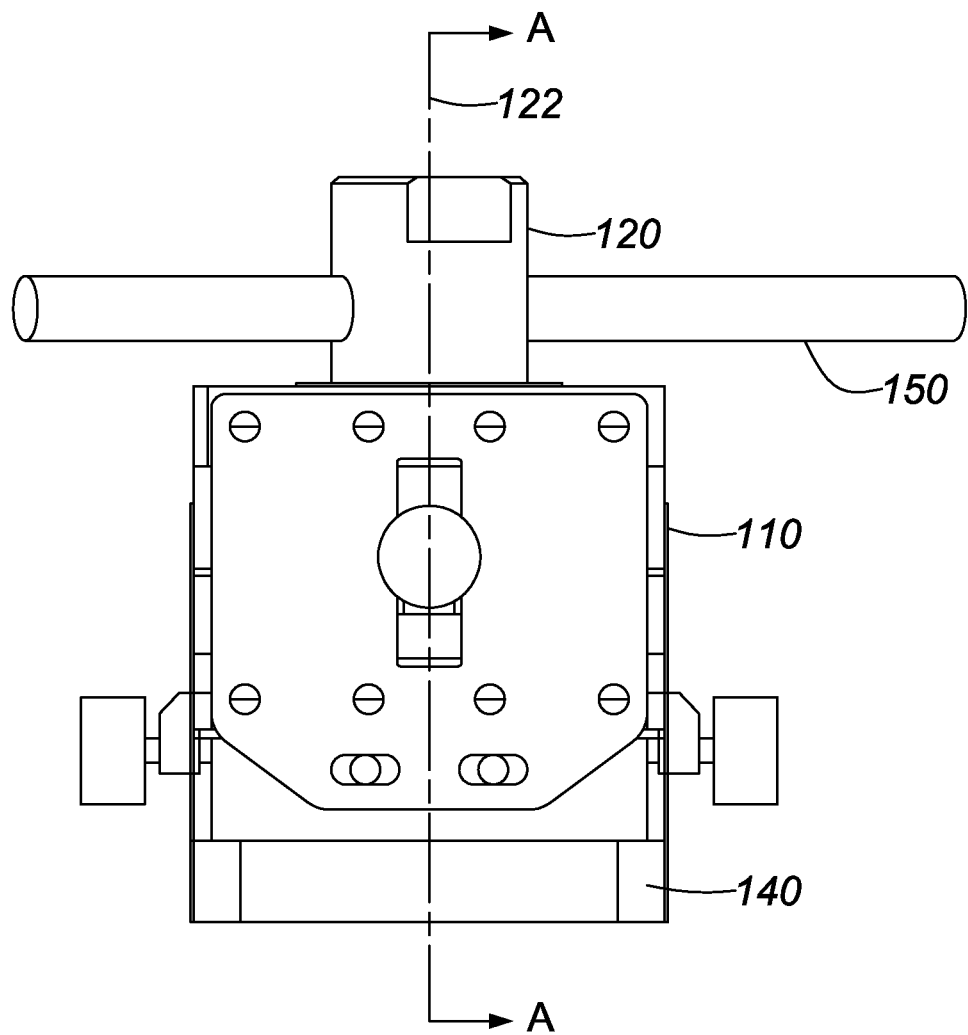
FIG. 5 is a side view schematic diagram of a two-way roundness device in accordance with one example embodiment of the present disclosure.
Figure 6:
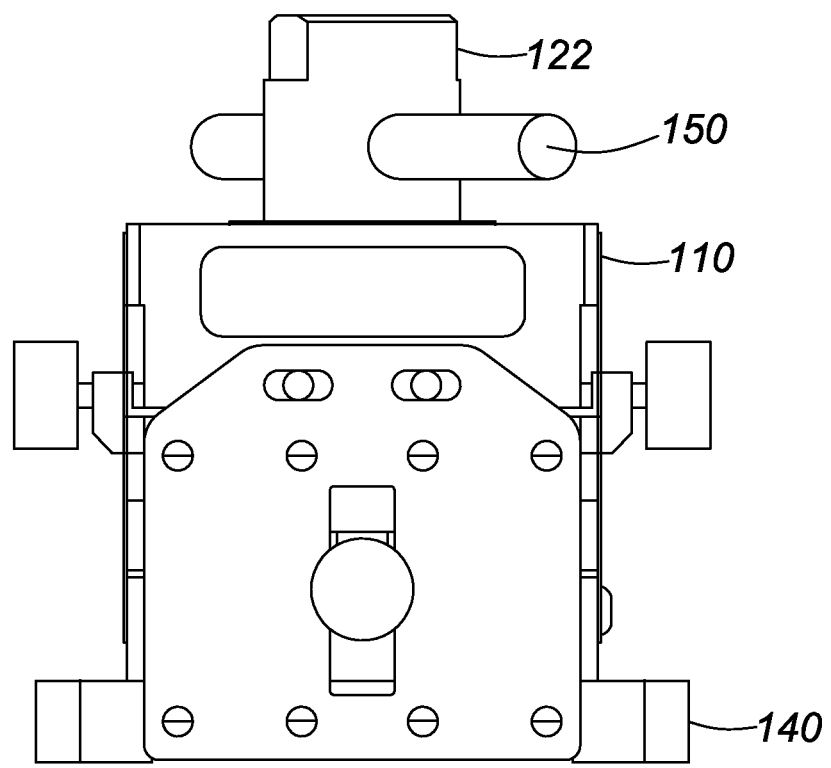
FIG. 6 is a side view schematic diagram of a two-way roundness device in accordance with one example embodiment of the present disclosure.

Referring to FIGS. 1A and 1B, two configurations of an embodiment of the two-way roundness device 100 will be described: the first with a rotating indicator in FIG. 1A (hereinafter referred to as "type 1"); and a second with a rotating part in FIG. 1B (hereinafter referred to as "type 2"). The change is achieved by reversing the order between fixed earth 180 and a spindle assembly-XY pair.

In the type 1 configuration shown in FIG. 1A, the XY stage 110 rests on a first side or the first side is attached to fixed earth 180 with the side with the spindle assembly 120 facing upwards. The first side has a planar portion sufficient to support the two-way roundness device when the first side is resting on a flat surface. The planar portion, in some embodiments, comprises the whole first side. In other embodiments, the planar portion is one or more portions of the first side. For example, the planar portion can be feet. The XY stage 110 has a spindle assembly 120 attached at the center of a second side of the XY stage. The spindle assembly 120 rotates on an axis 122 perpendicular to the fixed earth 180. In other embodiments, the XY stage 110 is attached to a base at the first side. An example of such an embodiment will be described with reference to FIGS. 2 to 7. In the embodiment shown in FIG. 1A, the XY stage rests on fixed earth when in the type 1 configuration. In some embodiments, the spindle assembly 120 comprises a rotating shaft, a housing and a bearing.

Non-limiting examples of the shapes of the XY stage 110 include a cylindrical shape, a cube, a rectangular prism, and a polygonal prism. The spindle assembly 120 in the example shown in FIG. 1 has a cylindrical shape. In some embodiment, a portion of the shaft extending beyond the bearings has a different shape, such as but not limited to square, triangular, and rectangular.

An arm 150 can be attached to a shaft of the spindle assembly 120 so that the arm extends parallel to the fixed earth 180 or at an angle. An indicator 130 can be attached to the arm. In use the spindle assembly rotates, thus rotating the indicator. In some embodiments, the arm has a cavity into which the spindle assembly is inserted and fixed into place. In some embodiments the spindle assembly had an attaching portion for attaching the arm to the spindle assembly. In some embodiments, the spindle assembly has a bore running through it parallel to (or at an angle to) the planar side of the XY stage and the arm can be inserted through the bore and fixed in place.

Non-limiting examples of the cross-section shape of the arm 150 include solid round, hollow round, solid rectangle, hollow rectangle or an I-beam. The cross-section shape and size of the arm can change. For example, the arm can be tapered or it can have a portion that is square and a portion that is round. The arm 150 can be made of a single piece, or of several pieces that can be attached together to make the whole arm. The arm 150 can be fixed length or variable length by means such as telescoping sections or brackets that allow one segment to slide with respect to the other section, thus allowing a wider range of measurements with a single arm. The arm 150 can have adjustable counterweights (or a special setup for balancing the arm) so that it can be balanced. The balancing segment of the arm may be part of the arm itself or a separate add-on item.

In some embodiments, there will be a locking mechanism where the arm 150 attaches to the spindle assembly 120. The locking mechanism can take many shapes or forms, some of which are shown in the figures. Non-limiting examples of the locking mechanism include: locking flexures, clamps, set screws, push or shrink fit, welding, and gluing.

In some embodiments, an adapter bracket is used to attach the indicator 130 to the arm 150. The adapter bracket may be adjustable, so the position and orientation of the indicator can be adjusted or routed into a specific position that is convenient for taking the specific measurement. In some cases, the indicator 130 attaches directly to the arm 150. An exemplary means of attaching the indicator directly is magnetically. Another example is through an interference fit. In some instances, an indicator adapter bracket may attach directly to the shaft or spindle assembly without any arm present. Typically, this would be for measuring smaller features.

In order to measure diameter variations, a long arm that spans the whole diameter of the part with an indicator at both ends can be used. In order to measure thickness variations (wall thickness or flange thickness etc.), two indicators can be placed at one end of a radial arm and the positions and orientations of the indicator can be adjusted independently.

Non-limiting examples of materials that can be used for the arm 150 are steel, aluminum, and carbon fibre composite. A material with a high stiffness to weight ratio will work better than one without. Matched or low thermal expansion designs can be used to reduce measurement uncertainty. Measurement uncertainty can also be improved by measuring the temperature (of the arm, air, part, etc.) and compensating for the temperature. Vibration of the arm could be dampened through structural design or with an active damper. For very long arms, a truss-like design with tension and compression members rather than a beam-style design can be used.

In some embodiments, an actuator is added to the arm so that the indicator can be positioned manually or automatically.

In some embodiments the indicator is for measuring roundness. In other embodiments the indicator is for measuring any one of concentricity, flatness, cylindricity, runout, concentricity, eccentricity, diameter or radius variation, thickness variation, and surface roughness. Many different types of indicators can be used including, but not limited to dial indicators, mechanical or electrical test indicators (lever arm type), capacitive sensors, and optical/laser sensor.

For type 1, in some embodiments, the arm 150 has a counterweight. In some embodiments, the counterweight is adjustable to balance the arm 150 depending on the radius at which the indicator 130 is located. In some embodiment, arms 150 of various lengths to cover the full range of possible sizes are provided.

To set up in the type 1 configuration, the location of the spindle assembly axis 122 is moved with respect to the part 160 in an XY plane to make the axes of the part and the spindle assembly coincident. In some cases and especially for large parts, moving a part is generally difficult and sometimes impossible. For example, it would be impossible for an installed hydroelectric turbine to be moved for testing. In the two-way roundness device described herein, because the XY stage is directly or indirectly connected to fixed earth, the spindle assembly axis 122 can easily be moved. Initially, the two-way device will need to be placed concentric to the part within the travel limits of the XY stage which is about ±2 mm for the device shown but could be much more or less depending on the stage mechanism details. In some cases, this can be done by tying a string around the spindle and rotating it around the part, checking the distance to the edge then moving the mounting point until the variation seen with a ruler is within limits.

For type 1, the device 100 can be oriented with the spindle assembly axis 122 vertical, horizontal, or at any other orientation. The device 100 can be taken into the field to measure, for example, a large ring sitting on a table. In some instances, the device 100 can be attached to the part 160 itself.

For the type 2 configuration, the location of the part 160 is moved with respect to the spindle assembly axis 122 in the XY plane. In type 2, the spindle assembly-XY stage pair is reversed with respect to the fixed earth 180 and the part 160 can be placed on the XY stage 110 and moved to make the axes coincident. The XY stage can be adjusted to assist in making the axes of the part and the spindle coincident. For type 2, the device 100 will typically be oriented with the axis 122 vertical and the part 160 located on a platform 170.

In the type 2 configuration shown in FIG. 1B, the XY stage 110 and the spindle assembly 120 pair are the same as in type 1. However, in use, they are inversed and the spindle assembly is attached to a base 140, which rests on fixed earth 180. The base 140 can be the same shape as the XY stage, or any other feasible shape. The spindle assembly 120 may be attached to the base 140 in any of a number of manners including, but not limited to, bolts, clamps, and magnets. In some embodiments, the base 140 is extended with the spindle assembly-XY pair located to one side, to allow for mounting the indicator 130 on the base. In the embodiment shown in FIG. 1B, the indicator is mounted to the fixed earth 180 using a mounting arm 132. The XY stage 110 rotates on the axis 122 perpendicular to the fixed earth 180. In some embodiments, the base 140 is an integral part of the XY stage.

To set up in the type 2 configuration, the part 160 is centered on the XY stage 110. In some embodiments, such as shown in FIG. 1B, a platform 170, is placed on the XY stage 110 for accommodating the part 160.

In type 2 use, the entire platform (e.g. the platform 170 and the XY stage 110) that the part 160 rests on is moved relative to the axis 122. This will result in greater eccentric loading and deflections than in the type 1 configuration.

The end result can alternatively be achieved by adding another XY stage in series. This solution has some disadvantages. Different XY stages include flexure stages, as in the example shown in the Figures, dovetail slides with micrometer or screw actuators, ball bearing stages, crossed roller bearing stages, recirculating ball linear guide stages, linear bushing stages, and many more. In general, the XY stage provides two linear motions perpendicular to each other. Some XY stages have a right angle bracket between individual linear stages. In some embodiments, an XZ stage is used. Stages in series can be created by adding another XY stage on the end of the shaft that is opposite to the existing XY stage. With this alternate design, using two stacked XY stages, both centerings can be achieved without reversing the assembly but at the cost of an extra stage, reduced stiffness and greater size. An additional stage for adjusting tilt can also be added at different locations in the system.

There are many ways of rotating the spindle assembly. In some embodiments, the spindle assembly is rotated manually. In some embodiments, the spindle assembly 120 is motorized. In some embodiments, rolling element bearings are used, such as but not limited to angular contact bearings, ball bearings, roller bearings, needle bearings, and spherical roller bearings. In some embodiments the spindle assembly uses an air bearing. In some embodiments, the spindle assembly uses a hydrostatic bearing. Many of these embodiments require external cables or tubes, which can become tangled during rotation of the spindle assembly. To avoid tangling, a pneumatic rotary joint, an electrical slip joint, or a wireless connection may be used. In some embodiments, the spindle assembly has an angular encoder. In some embodiments, the encoder is wireless.

Air bearings are more expensive than ball bearings, especially if motorized. However, an advantage of air bearing is that they can be stiffer than ball bearings, and have accuracies typically of less than a few nanometres (nm). Ball bearings typically have accuracies of several hundred nm. If the measurement is taken always in the same ±180° region of travel, then this can be reduced to about 200 nm, and if the spindle error is measured and accounted for further reduced to effectively about 30 nm.

In some embodiments, the two-way roundness tester has a mechanical device, such as a toggle, that prevents rotation through more than 360°. By limiting the rotational angle of the bearings, the rolling element bearing errors can be removed mathematically from the measurement, thus leaving other errors and the roundness of the part being measured. This is so because the rolling element bearing errors are repeatable but only at the exact same angle and not on a per rotation basis. For example if the spindle starts at zero and rotates through 720° degrees, the error profile from 0°-360° will be different from the error profile from 360°-720°. However, if the bearing is subsequently wound back to zero then once again rotated through 720 degrees, the error profiles from 0°-360° and 360°-720° will be essentially the same as they were the first time around.

Keeping the previous point in mind, in another aspect of the present disclosure, there is provided a procedure for measuring repeatable spindle error over some range and then using the measurement data to improve the accuracy of the roundness measurement. The procedure for measuring the repeatable spindle error can be simple or a bit more complex. The range of bearing rotation does not necessarily have to be the ±180° or 360°. These are provided as examples only. In other implementations, it might be an advantage to go over a few rotations. Any range that limits travel or permits a determination of where the spindle was during the spindle error measurement is possible. The roundness testing must be done in the same zone as the error measurement.

The spindle error measurement is done by measuring a nearly perfect part (known as an artifact). If the part was actually perfect, then the measured value would be the spindle error plus any additional measurement errors, which are assumed to be small. This method ignores the error of the artifact, which in some cases is significant. There are methods to separate the spindle error and the artifact roundness. One of these methods is called Donaldson reversal. In some embodiments of the disclosed roundness device, features are included to enable measuring the spindle error and using Donaldson reversal or other separation methods to remove the artifact form error.

The mechanical device referred to may be any sort of mechanical stop, such as a toggle, that limits the rotation within some boundary (not necessarily 360 degrees) so that the absolute rotational position can always be determined. Alternatively, a mechanical counter could be used which would keep track of the absolute angle but not limit the travel. In some embodiments, a preferred range where the spindle errors are minimized is determined and that preferred range is used for the roundness testing.

In the disclosed two-way roundness device, spindle errors manifest differently when using the two different configurations (rotating sensors or rotating part). The user can either measure the spindle error in the same manner that the roundness tester will be used or a calculation can be done to transform the spindle error from one configuration to the other.

The axial location where the measurement is taken also influences the spindle error so again the user should measure the spindle error at the same axial location that the roundness tester will be used if the spindle error magnitude is deemed significant.

Depending on how repeatable the spindle error is and for how many cycles it remains so, the spindle measurement may be done once in the factory then as part of an annual calibration of the system. Or possibly done once for the life of the assembly, or possibly done by the user at a prescribed interval. In many cases the spindle error will be small enough to ignore.

Brackets, tables, spacers, etc. may be located anywhere in the metrology loop and may be fixed or removable. These components can be used to make the reversal easier, to add adjustments, or to allow various alternative setups. All components in the metrology loop should be designed for high rigidity. The metrology loop is a physical path from the measuring point, through the part, through the mounting of the part, through what is supporting the part, through whatever is supporting the indicator, through the indicator itself, and back the measuring point. Every interface and structure in this loop has the ability to introduce errors or uncertainty to the measurement. For example a loose joint between two parts, thermal expansion of one component, vibration of a stand, etc. can all cause measurement error.

In some embodiments, another type of tool can be attached to the arm 150 or the mounting arm 132. For example, a cutting tool can be attached and used to cut the part or mark circles in a work piece. In another example, a very sharp knife can be used to score a circle in a piece of metal.

The two-way roundness device can be made of any number or combinations of material. In some embodiments, components of the device are metal. In some embodiments, the device 100 is made of completely non-magnetic material, such as but not limited to Polymers, ceramic, non-magnetic metals such as aluminum, brass, titanium, fiberglass, or composites such as CFC (carbon fiber composite). The option of using non-magnetic material is useful when measuring a permanent magnet device such as some motors and generators, or in the presence of a magnetic field.

Referring to FIGS. 2 to 11, a prototype of an example embodiment of the two way roundness device will be described. In the prototype, the two-axis stage 110 is a cube, and a base 140 is used in both the type 1 (FIGS. 2 to 7) and type 2 (FIGS. 8 to 11) configurations.

Figure 8:
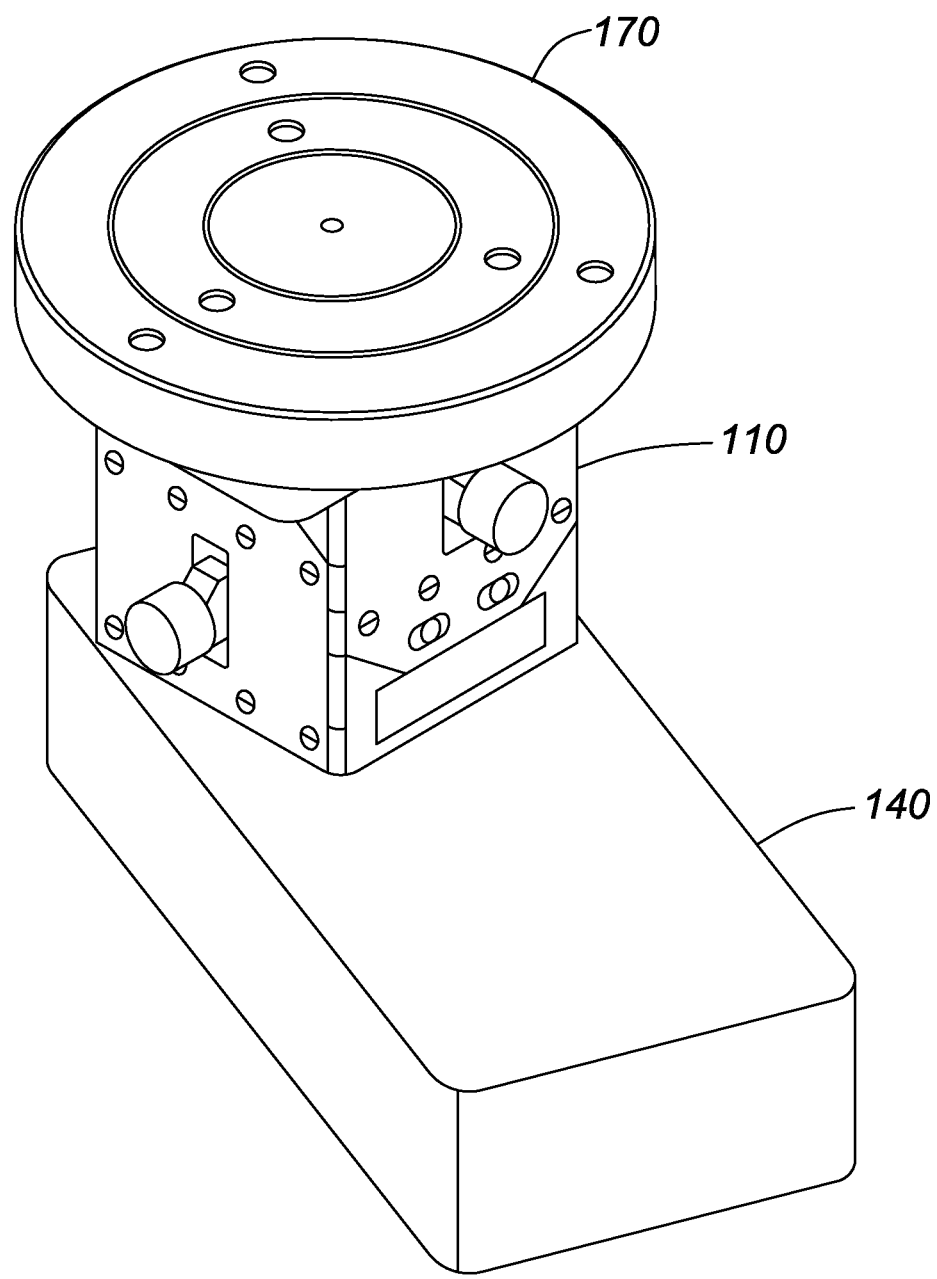
FIG. 8 is a perspective view schematic diagram of a two-way roundness device in accordance with one example embodiment of the present disclosure.
Figure 9:
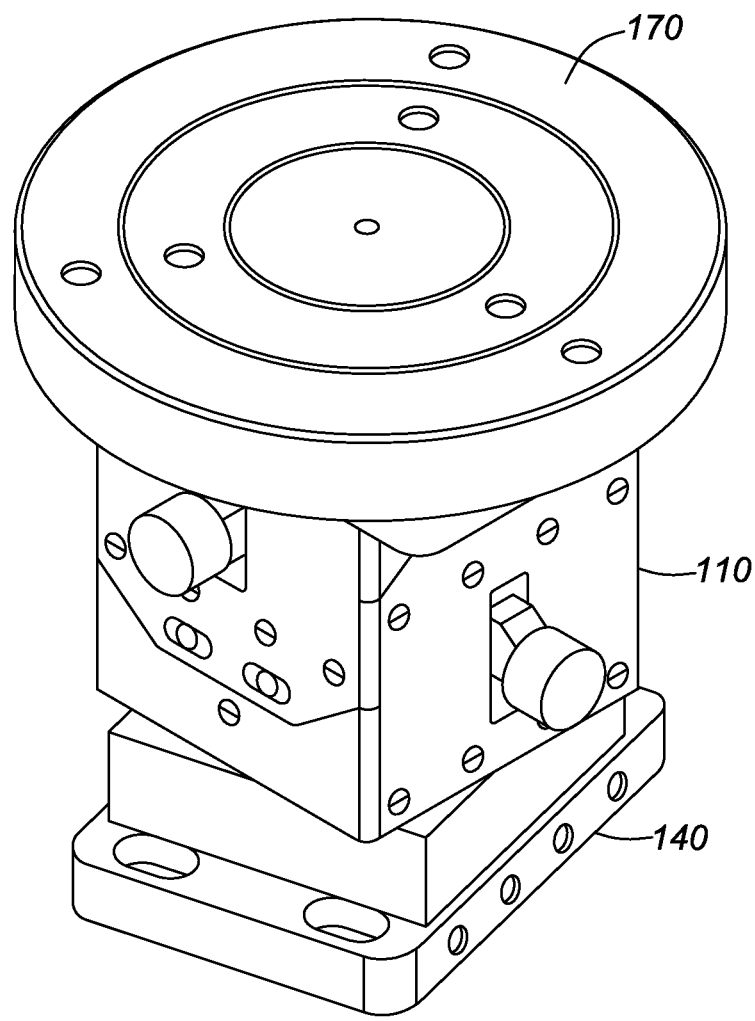
FIG. 9 is a perspective view schematic diagram of a two-way roundness device in accordance with one example embodiment of the present disclosure.
Figure 10:
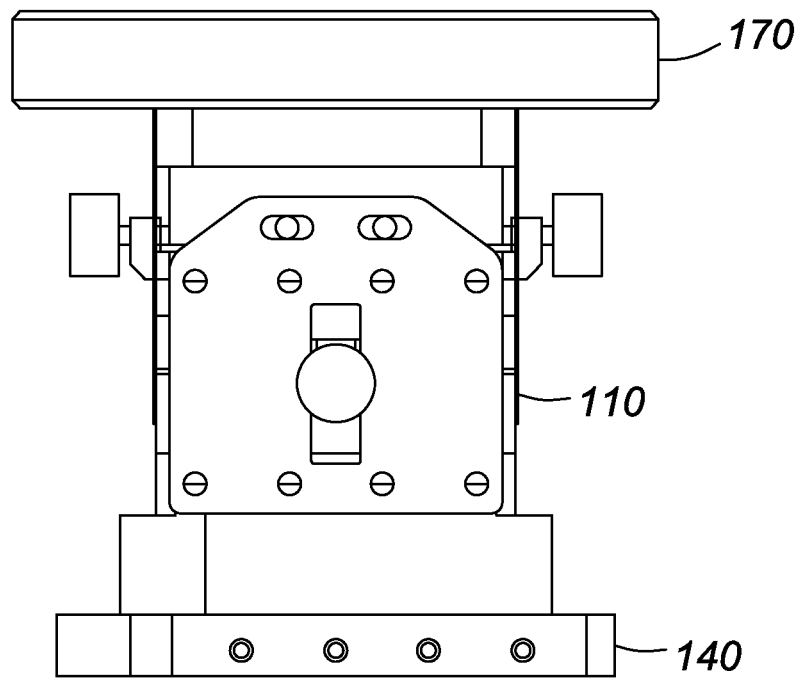
FIG. 10 is a side view schematic diagram of a two-way roundness device in accordance with one example embodiment of the present disclosure.
Figure 11:
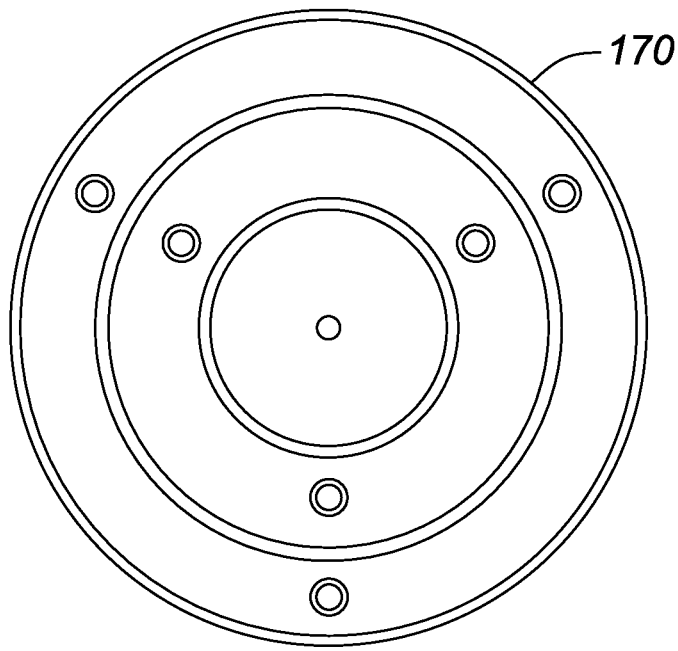
FIG. 11 is a top view schematic diagram of a two-way roundness device in accordance with one example embodiment of the present disclosure.

In the prototype shown, with the exception of FIG. 8, the base is flush with the XY stage in two opposite sides and extends enough on the other two sides to allow for mounting holes to attach the base to fixed earth. FIG. 8 shows an embodiment, where the base is extended on one of the sides to allow a mounting arm 132 to be attached to the base.

Figure 7:
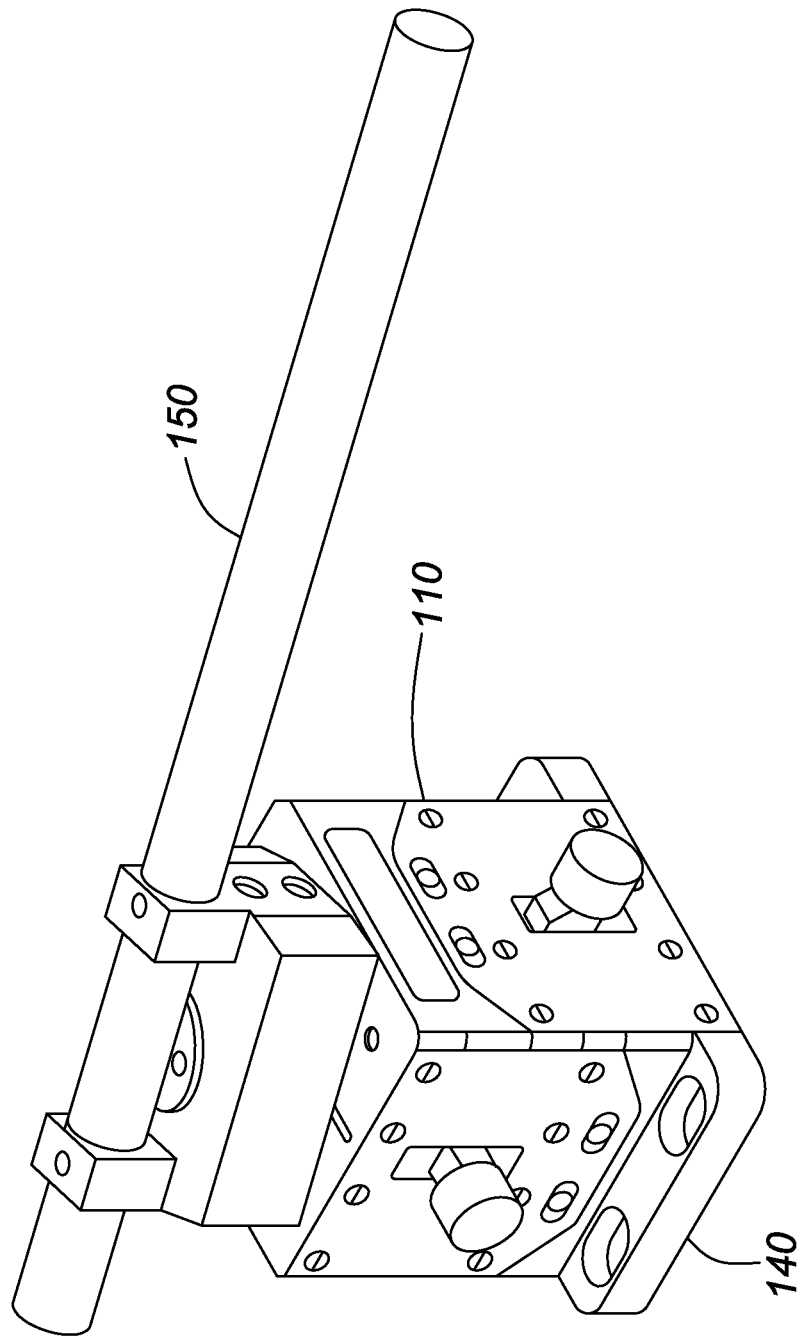
FIG. 7 is a perspective view schematic diagram of a two-way roundness device in accordance with one example embodiment of the present disclosure.

For the type 1 configuration, two examples are shown for mounting the arm to the spindle assembly. In the embodiment of FIGS. 1 to 6, the arm extends through a bore running through the spindle assembly perpendicular to the axis 122. In the embodiment of FIG. 7, a bracket fits over and is attached to the spindle assembly with two attachments to hold the arm 150 in a horizontal position. The bracket rotates with the spindle assembly.

The XY stage 110 of the prototype has four adjustment screws, one on each vertical side. The adjustment screws 330 allow the position of the spindle assembly to be adjusted. When the adjustment screws are turned the stage will move in an approximate straight line guided by the flexures. Each adjustment screw is held in place with an adjustment screw bracket 332. In this embodiment, there are two sets of opposing screws, for four screws in total in this case. In the design shown, the screws push against a surface that is part of the XY stage and cause the flexures to bend and thus a horizontal motion in either the X or Y direction occurs (depending which set of screws are turned). The purpose is for centering of the part and axis of rotation in the XY direction only. Two screws are used in this design so when adjusted they can push against each other and lock the stage. There are also slots on the flexures without screws (see FIG. 2 for example) that would normally have screws in them to lock the flexures so the XY stage becomes much more rigidly locked than can be done with the set screws.

The spindle assembly has a bearing housing 340 in which the spindle assembly 120 rotates by means of a bearing 342. In some embodiments (such as the embodiment shown in FIG. 3), the bearing housing portion of the spindle assemble are form part of the XY stage. Combining the bearing housing with the XY stage reduces the number of parts, the size and cost of the assembly.

An encoder 310 is located within the bearing housing at a base of the spindle assembly. In this case, the encoder is measuring angular movement. One type of encoder that can be used has two main parts: a read head: and a rotating disc. The rotating disc is attached to a part that rotates relative to another part. The rotating disc will have marks on it that can be read by the read head. The read head reads the marks on the disc as the disc is rotating and this is used to identify angular orientation of one part with respect to the other. Other types of encoder could be used. In some embodiments, a battery powered encoder is used.

In some embodiments, the device comprises control electronics and software to read the encoder. If a motor is used, control electronics and software can be used to control the motor. Likewise, control electronics and software can be used to read the indicator.

In some embodiments, analysis software is used to analyze data collected from the indicator to calculate roundness and/or other properties of the part. Non-limiting examples of other properties that can be calculated include surface roughness and flatness.

In some embodiments, the device comprises a display. The display can be used in some cases to display an angle from the encoder. In some cases, readings from the indicator are displayed on the display.

In some embodiments, the device comprises a communications output, such as a USB port for outputting data from the indicator and/or encoder.

In some embodiments, electrical components, such as the encoder, motor and indicator are battery powered.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A two way roundness device operable in two different configurations comprising:
    a two-axis stage, movable in two perpendicular directions and having a first side with a planar portion sufficient to support the two-way roundness device when the first side is resting on a flat surface, the planar portion being parallel to the two directions of movement;
    a spindle assembly attached to the two-axis stage in the center of a second side opposite the first side, the spindle assembly being rotatable about longitudinal axis of rotation perpendicular to the two directions of movement of the two axis stage; and
    an arm having a tool receiving portion and being attachable to the spindle assembly, whereby, in a first configuration, the two way roundness device is operable with the spindle oriented above the first side, with the arm attached to the spindle and the spindle assembly being rotatable; and in a second configuration, the two way roundness device is operable with the first side oriented above the spindle assembly and the two-axis stage being rotatable.

2. The roundness device of claim 1, further comprising a base attachable to fixed earth on one side and attachable to the spindle assembly.

3. The roundness device of claim 1, wherein the spindle assembly comprises an attachment for receiving the arm such that one end of the arm is held at a distance from the axis of rotation.

4. The roundness device of claim 3, wherein the arm extends at an angle from the axis of rotation.

5. The roundness device of claim 1, further comprising an indicator for measuring roundness and wherein the tool receiving portion is configured to receive an indicator for measuring roundness.

6. The roundness device of claim 1, wherein the first side is attachable to a base.

7. The roundness device of claim 1, wherein the first side is attachable to fixed earth.

8. The roundness device of claim 1, further comprising a platform attachable to the first side.

9. The roundness device of claim 1, comprising components made of non-magnetic material.

10. The roundness device of claim 1, wherein the spindle assembly comprises a bearing assembly comprising rolling element bearings for causing rotation of the spindle assembly.

11. The roundness device of claim 1, wherein the spindle assembly comprises a bearing assembly comprising an air bearing for causing rotation of the spindle assembly.

12. The roundness device of claim 11, further comprising a rotary joint for supplying pressurized air to the air bearing.

13. The roundness device of claim 1, wherein the bearing assembly comprises a bearing housing and one or more bearings.

14. The roundness device of claim 1, further comprising an encoder for measuring angular movement.

15. The roundness device of claim 1, comprising a motor for turning the spindle assembly or the two-axis stage.

16. The roundness device of claim 1, further comprising:
a rolling element bearing in the bearing assembly;
a mechanical device to limit rotation of the spindle assembly to a predetermined angle;
an indicator for measuring roundness.

17. The roundness device of claim 1, further comprising:
a rolling element bearing in the bearing assembly;
a mechanical counter to measure the absolute angle of rotation of the spindle assembly; and
an indicator for measuring roundness.

18. The roundness device of claim 1, wherein the two-axis stage is an XY stage.

19. The roundness device of claim 1, wherein the two-axis stage is an XZ stage.

20. The roundness device of claim 1, wherein the spindle assembly comprises a bearing housing, the bearing housing also being an integral part of the two-axis stage.

* * * * *